United States Patent [19]
Dennis

[11] Patent Number: 5,358,644
[45] Date of Patent: Oct. 25, 1994

[54] METHOD AND APPARATUS FOR DECANTING LIQUID

[75] Inventor: Thomas A. Dennis, Dixon, Ill.

[73] Assignee: Aqua-Aerobic Systems, Inc., Rockford, Ill.

[21] Appl. No.: 58,178

[22] Filed: May 10, 1993

[51] Int. Cl.⁵ .............................................. B01D 21/24
[52] U.S. Cl. ................................... 210/744; 137/398; 210/123; 210/242.1; 210/800
[58] Field of Search ............... 210/121–123, 210/127, 242.1, 242.2, 744, 776, 923, 525, 800; 137/398, 413, 578

[56] References Cited

U.S. PATENT DOCUMENTS

| | | | |
|---|---|---|---|
| 1,544,640 | 7/1925 | Gibbs | 137/398 |
| 4,601,833 | 7/1986 | Shubert | 210/122 |
| 4,695,376 | 9/1987 | Astrom et al. | 210/122 |
| 4,711,716 | 12/1987 | Calltharp et al. | 210/525 |
| 4,997,557 | 3/1991 | Andersen | 210/242.1 |
| 5,036,882 | 8/1991 | Norcross et al. | 210/136 |
| 5,104,528 | 4/1992 | Christie | 210/242.1 |
| 5,106,494 | 4/1992 | Norcross | 210/123 |
| 5,234,580 | 8/1993 | Murphy | 210/242.1 |

*Primary Examiner*—Joseph W. Drodge
*Attorney, Agent, or Firm*—Vernon J. Pillote

[57] ABSTRACT

A decanter apparatus and method of operating the same to decant liquid from adjacent the surface in a tank. The decanter apparatus includes a decanter receptacle having a top opening surrounded by a decanter rim, a decant pipe having an inlet end communicating with the decanter receptacle and a discharge end extending out the tank, and a float overlying the decanter receptacle and connected thereto for relative movement between a decanter closed position in which the float engages the decanter rim and a decanter open position in which the decanter rim is spaced below the float. The decanter receptacle when empty in the decanter closed position has sufficient positive buoyancy to buoyantly support the decanter assembly with the decanter rim above the surface of the liquid in the tank. The float has sufficient positive buoyancy to buoyantly support the decanter receptacle when the latter is in the decanter open position and filled with liquid. A decant valve outside the tank controls flow of liquid from the decanter and a priming valve outside the tank controls supply of priming liquid to the decanter receptacle. The decanter apparatus is operated through a decant cycle by operating the decant valve and priming valve.

16 Claims, 2 Drawing Sheets

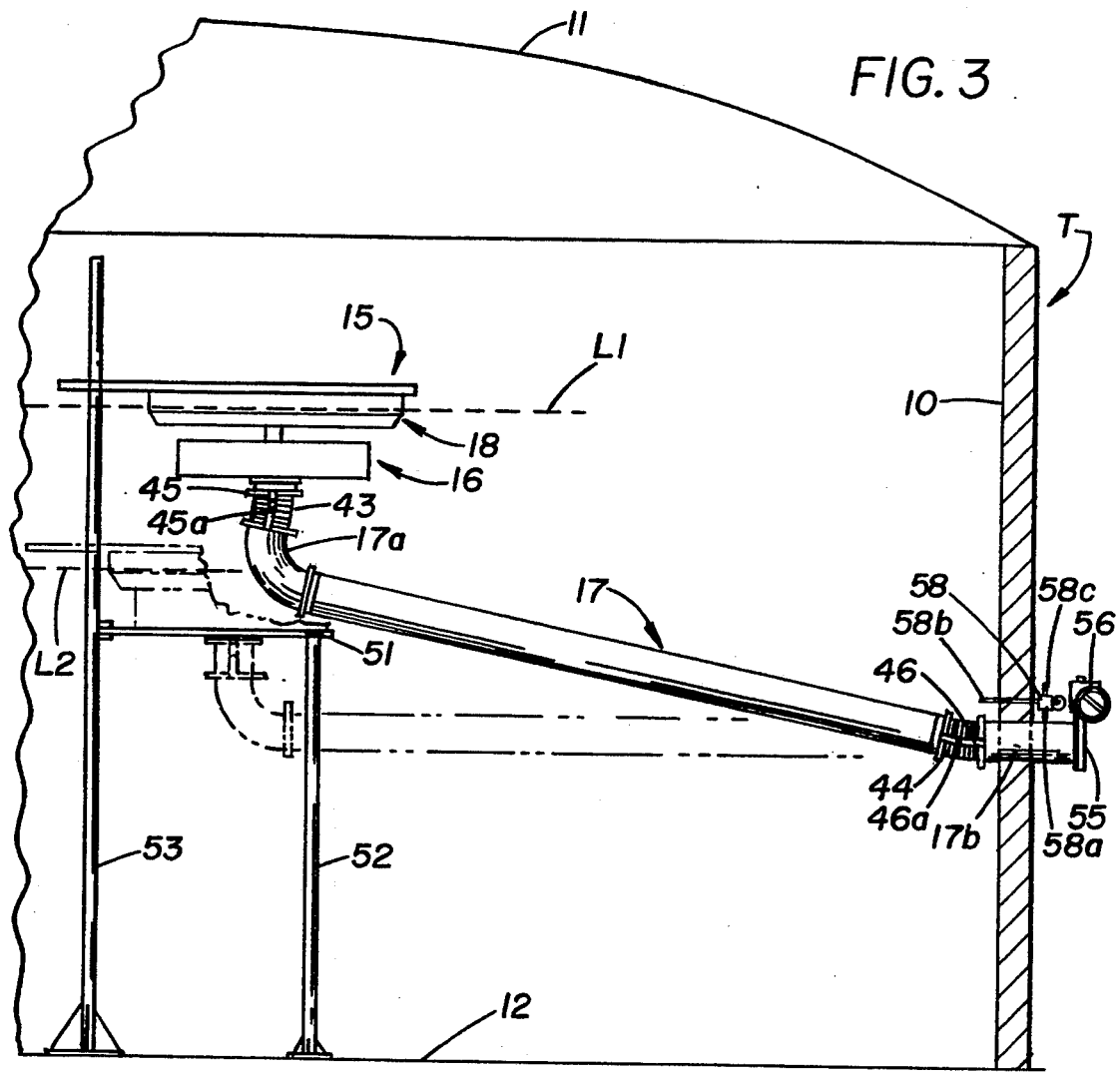
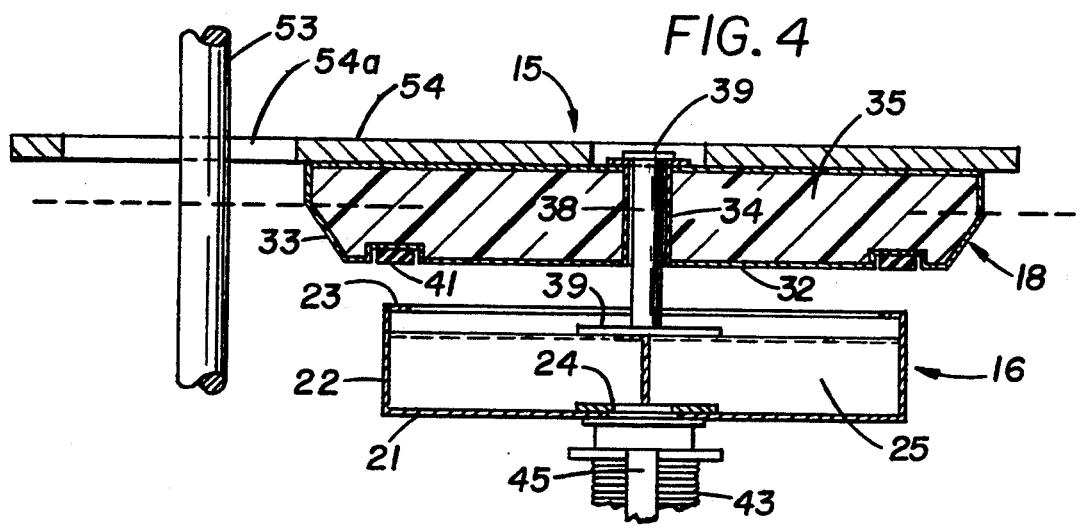

METHOD AND APPARATUS FOR DECANTING LIQUID

BACKGROUND OF THE INVENTION

The present invention relates to floating type decanters for removing supernate from near the top of a liquid surface. In some installations, for example in the sequencing batch reactor process of waste water treatment, it is important to prevent entrance of material into the decanter during those times when the decanter is not being operated in decant mode. More particularly, in a sequencing batch reactor process of waste water treatment, a basin reactor is operated through successive fill, react, settle and decant phases and any suspended solids that enter the decanter during the fill, react and settle phases will be subsequently discharged with the decanted effluent during the decant phase and adversely affect the quality of the effluent. Different decanter designs have been made to overcome this problem. U.S. Pat. 4,601,833 discloses providing a floating decanter and lifting the decanter entirely our of the water in the basin during the fill, react and settle phases, with a trough to cover the inlet of the decanter during lifting of the decanter out of the basin and lowering of the decanter back into the basin to prevent entrance of floating debris. U.S. Pat. No. 4,695,376 discloses a floating decanter in which a decanter receptacle is disposed below a float and a power operated actuator is mounted on the float and connected to the decanter receptacle for selectively moving the decanter receptacle from a lower position in which the decanter rim is spaced below the underside of the float to a raised position to seal the decanter rim to the underside of float. Such decanters having power operated actuators present some problem as regards servicing particularly in closed tanks, and further present problems as regards use in tanks containing a combustible liquid or explosive atmosphere.

SUMMARY OF THE INVENTION

It is an object of the present invention to provide a floating decanter system which does not require a power operated mechanism to move the decanter between an open and a closed position; which is suitable for use in a combustible or explosive environment; and which has few relatively moving parts and requires little or no maintenance.

Accordingly, the present invention provides a decanter assembly including a decanter receptacle having a top opening surrounded by a decanter rim, a decanter pipe having an inlet end communicating with the decanter receptacle and a discharge end, and a float overlying the decanter receptacle and connected thereto for relative movement between a decanter closed position in which the float engages the decanter rim and a decanter open position in which the decanter rim is spaced below the float. The decanter receptacle and decant pipe, when empty have sufficient positive buoyancy to buoyantly support the decanter receptacle in the decanter closed position engaging the float. The float has sufficient positive buoyancy to buoyantly support the decanter receptacle when the latter is in the decanter open position and filled with liquid. A decanter discharge valve is provided for controlling the flow of liquid from the decanter pipe and a decanter priming valve is provided for supplying priming liquid to the decant pipe.

The decanter assembly is operable through a decant cycle that is started when the surface of the liquid in the tank is at an upper level and the decanter assembly is buoyantly supported in the decanter closed position at the surface of the liquid in the tank. The start step includes closing the decant valve to stop flow of liquid from the discharge end of the decant pipe and opening the priming valve to supply decanter priming liquid to the closed decanter receptacle until the buoyancy of the decanter receptacle changes to a negative value and the decanter receptacle moves downwardly relative to the float to the decanter open position.

The priming valve is then closed to stop supply of liquid to the decanter assembly and the decant valve is opened to discharge decanted liquid from the decanter assembly through the decanter pipe. The float supports the decanter receptacle with the rim spaced below the liquid level as the liquid level moves down during decanting, and the downward movement of the decanter receptacle is stopped when the receptacle reaches a preselected lower position. The decant valve is maintained open to continue discharge of liquid from the decanter receptacle while the float moves downwardly relative to the decanter receptacle to the decanter closed position and at least until the decanter receptacle is sufficiently empty to buoyantly raise and hold decanter receptacle in the decanter closed position engaging the float.

The decanter priming liquid can be supplied from liquid in the tank or from a source external to the tank. The decant valve and actuator therefor are advantageously located externally of the tank and the priming valve and actuator are also advantageously located externally of the tank.

BRIEF DESCRIPTION OF THE DRAWING

FIG. 3 is a fragmentary sectional view through the tank illustrating the decanter in an open position during a decant cycle; and FIG. 4 is a fragmentary sectional view on a larger scale than FIG. 3 illustrating the decanter in an open position.

DETAILED DESCRIPTION

Figure 1:
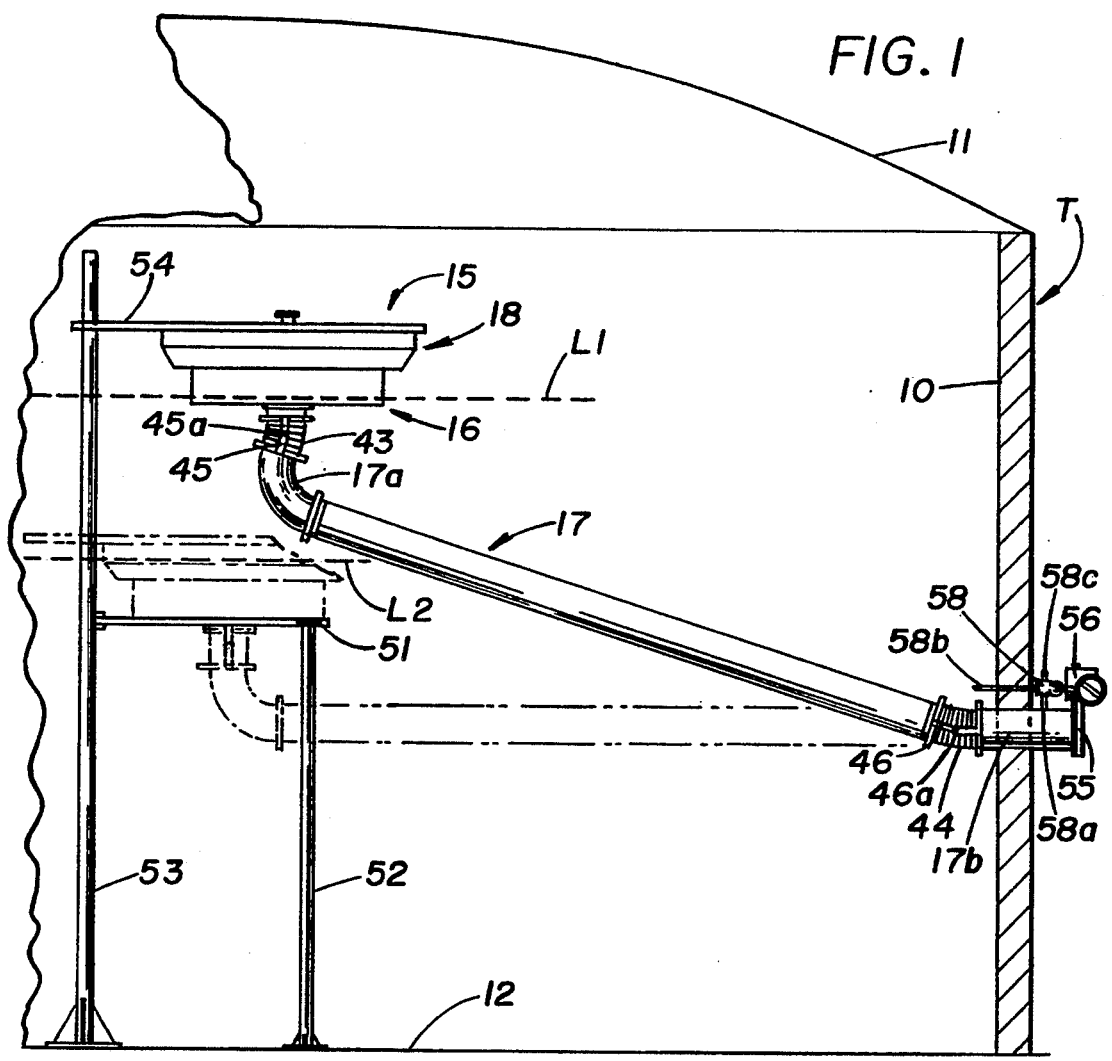
FIG. 1 is a fragmentary sectional view through a tank and illustrating the decanter apparatus floating on the surface of the liquid in the tank prior to the start of a decant cycle.

A decanter apparatus is illustrated in FIGS. 1 and 3 in an enclosed tank T having side walls 10, a top or cover 1 and a bottom 12. The decanter apparatus can also be used in open top tanks, basins and other liquid containing receptacles, and tanks, basins and receptacles are referred to herein and in the claims collectively as tanks.

Figure 2:
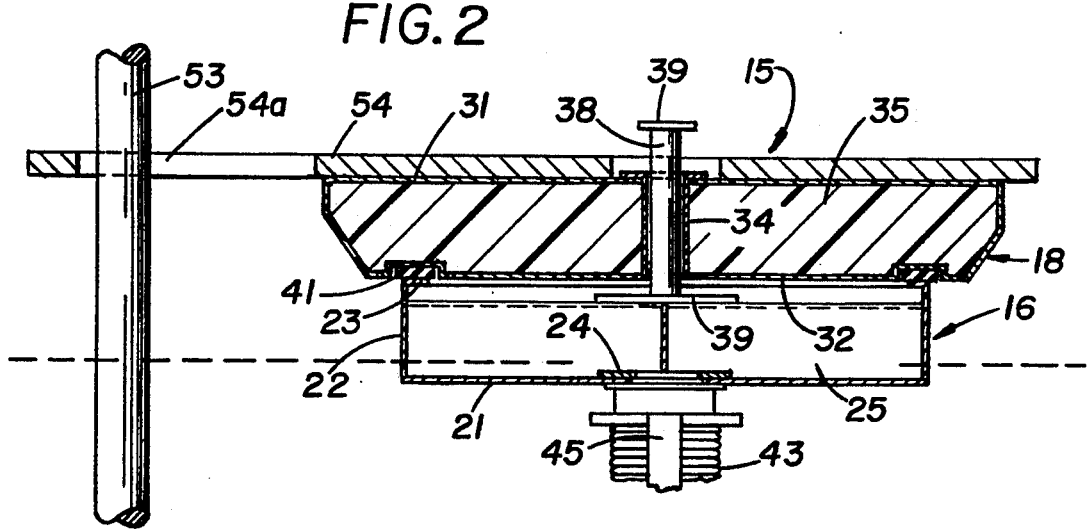
FIG. 2 is a fragmentary vertical sectional view on a larger scale than FIG. 1, illustrating the decanter apparatus in a decanter closed position.

The decanter assembly is designated generally by the numeral 15 and includes decanter receptacle 16, a decanter pipe 17 and a float 18. As best shown in FIGS. 2 and 4, the decanter receptacle 16 has a bottom 21 and side walls 22 terminating in an upper decanter rim 23. The decanter has an outlet opening 24 in the bottom wall 21 and baffles 25 are provided in the decanter receptacle and extend from outlet opening 24 to the outer wall 22 and divide the decanter receptacle into a plurality of sectors each of which communicates at its radially inner end with the outlet 24 to substantially equalize inflow of liquid around the rim 23 of the decanter receptacle.

In the preferred embodiment illustrated, the float 18 is in the form of an annulus having a top wall 31, a bottom wall 32, a peripheral side wall 33 and a sleeve 34 extending between the top and bottom walls. The walls of the float may be formed of a metal such as stainless steel or fiber glass and the float is advantageously filled with a light weight filler such as polyurethane foam 35.

The float and receptacle are interconnected for relative movement between a closed position as shown in FIGS. 1 and 2 and in an open position as shown in FIGS. 3 and 4. For this purpose, a stem 38 is attached by a flange 39 at its lower end to the baffles 25 in the decanter receptacle, and the stem extends loosely through the sleeve 34 and has a head 39 at its upper end. The head is spaced above the float when the receptacle is in the closed position as shown in FIG. 2 and the head is arranged to engage the float and limit downward movement of the decanter receptacle in the decanter open position as shown in FIG. 4. A means such as a resilient seal ring 1 is preferably provided for sealing the rim on the decanter receptacle to the float in the decanter closed position. The seal ring 41 is conveniently mounted in a recess 42 on the underside of the float, as best shown in FIGS. 2 and 4.

The decant pipe 17 includes an elbow 17a at one end connected through a flexible bellows type connector 43 to the decanter receptacle and the discharge end of the decant pipe is connected through a flexible bellows type connector 44 to a pipe fitting 17b that extends through a side wall 10 of the tank. Links 45 are attached to the decanter receptacle and to the elbow 17a to pivotally interconnect the elbow and receptacle for movement about a horizontal axis 45a perpendicular to the vertical plane of movement of the pipe 17, and the discharge end of the pipe 17 and the pipe section 17b are also pivotally interconnected by links 46 for relative movement about a horizontal axis 46a, perpendicular vertical to the plane of movement of the pipe 17. With this arrangement, the decanter receptacle and effluent can remain generally horizontal while the pipe 17 moves through arc to accommodate vertical movement of the float and receptacle. The decant pipe 17 can be formed of any suitable material and is preferably formed of a light weight material such as PVC pipe or thin walled stainless steel.

A receptacle stop frame 51 is supported as by posts 52 and 53 on the bottom of the tank and arranged to engage the decanter receptacle and stop downward movement when the decanter receptacle reaches a preselected lower position. The float 18 is guided to vertical movement relative to the decanter by sleeve 34 and stem 38 as previously described, and the decanter and float assembly are guided for generally vertical movement toward and away from the decanter stop 51 by a bracket 54 that guidably engages an upper portion of post 53. As shown in FIGS. 2 and 4, the bracket 54 is slotted at 54a to receive the post 53 and accommodate limited horizontal movement of the float and receptacle assembly that occurs during the vertical swinging movement of the decant pipe.

Discharge of decanted liquid is controlled by a decant valve 55 on the decant pipe and preferably located externally of the tank T. The decant valve can be operated with a manual operator or electro-responsive operator indicated at 56. A decanter priming valve 58 is provided for supplying priming liquid to the decanter through the decant pipe 17. The decanter priming valve is arranged to supply priming liquid from the tank at a location intermediate the upper and lower liquid levels $L_1$ and $L_2$ and can comprise a two-way valve of conventional construction. In the embodiment illustrated, the priming valve is a three-way valve having an outlet 58a that communicates with decant pipe; a first inlet 58b that communicates with the tank above the lower liquid level therein, and a second inlet 58c arranged for connecting to an external supply of priming liquid (not shown). The three-way valve 58 is of conventional construction and is movable between a position shutting off flow from either inlet to the outlet 58a, and positions communicating either inlet 58b or 58c with the outlet.

The decanter receptacle 16 is constructed of a material and of a size such that, when the decanter receptacle and decant pipe are empty and in the decanter closed position as shown in FIGS. 1 and 2, the decanter receptacle and pipe have sufficient positive buoyancy to buoyantly hold the decanter receptacle in the decanter closed position engaging the float, preferably with the decanter rim 41 above the surface of the liquid in the tank. The float 18 has sufficient positive buoyancy to buoyantly support the decanter receptacle when the latter is in the decanter open position and filled with liquid, as shown in FIGS. 3 and 4. When in the open position, the decanter and rim are spaced below the float to decant liquid from below the surface of the liquid and inhibit entrance of floating debris. The outer wall 33 of the float is preferably beveled as shown so that the water level rises above the bottom of the float before the decanter opens, to aid in inhibiting entrance of floating debris during opening of the decanter receptacle. The discharge pipe fitting 17b is located at a level in the wall of the tank so as to drain liquid from the decanter receptacle and preferably to also drain a substantial portion of the liquid from the decant pipe when the decanter is resting on the stop 51.

The decanter apparatus is operable through a decant cycle as follows. When the surface of the liquid in the tank is at an upper level indicated at $L_1$ in FIG. 1 the decanter and receptacle are in a closed condition and the decanter assembly is buoyantly supported at the surface of the liquid in the tank, preferably with the decanter rim above the surface of the liquid in the tank as shown in FIGS. 1 and 2. To start a decant cycle, the decant valve 55 is closed and the priming valve 58 is opened to supply priming liquid to the decant pipe from either the inlet 58b that communicates with the tank or the inlet 58c that communicates with an external source of priming liquid. The priming valve supplies priming liquid at a low flow rate as compared to the flow rate of the decant valve, and as the priming liquid flows into the decant pipe, the decant receptacle gradually fills and moves downwardly relative to the liquid level until the decanter is buoyantly supported only by the float 18 with the decanter rim spaced below the float as shown in FIG. 3. The priming valve is then closed and the decanter outlet valve opened to decant liquid from the tank. The float 18 continues to buoyantly support the decanter receptacle as the liquid level moves downwardly from the upper level $L_1$ and, when the decanter receptacle reaches a preselected lower position it engages the decanter stop 51. The decant valve is maintained in an open position so that the liquid level continues to move downwardly until the float approaches the decanter rim and at least substantially shuts off flow into the decanter receptacle. The decanter valve is maintained in an open position to drain liquid from the closed decanter until the positive buoyancy of the closed decanter receptacle and decant pipe is sufficient to buoyantly hold the decanter receptacle in the closed position in engagement with the float. The decanter receptacle and float then rise to a position in which the float is supported on the decanter rim with the decanter rim above the liquid level. The decant valve is preferably maintained in an open position during refill of the tank to its upper liquid level $L_1$. The decant cycle can then be repeated.

From the foregoing it will be seen that the decanter can be operated through a decant cycle by controlling the decant valve and priming valve located externally of the tank. In order to further enhance use of the decant apparatus in tanks containing inflammable liquids or having an inflammable or explosive atmosphere, the parts having relative movement in the tank such as the sleeve 34 and stem 38 and the guide arm 54 and post 53 are preferably coated or made of material such as would not cause sparking during relative movement.

The embodiments of the invention in which an exclusive property or privilege is claimed are defined as follows:

1. A decant apparatus for decanting liquid from adjacent the surface of liquid in a tank comprising: a decanter assembly including a decanter receptacle means having a top opening surrounded by a rim, decant pipe means having an inlet end communicating with the decanter receptacle means and a discharge end extending out of the tank, and float means overlying the decanter receptacle means and connected thereto for relative movement between a decanter closed position in which the rim is in engagement with the float means and a decanter open position in which the rim is spaced below the float means, the decanter receptacle means and decant pipe means having a negative buoyancy when filled with liquid and the float means having sufficient positive buoyancy to buoyantly support the decanter receptacle means in the decanter open position when the latter is filled with liquid, priming valve means operable to an open position for supplying priming liquid to the decanter receptacle mans when the latter is in the decanter closed position to reduce the buoyancy of the decanter receptacle means sufficient to allow the decanter receptacle means to gravitationally move downwardly relative to the float means to the decanter open position with the decanter rim spaced a selected distance below the float means, decant valve means for discharging decanted liquid from the decanter receptacle means, and decanter stop means for stopping downward movement of the decanter receptacle means at a preselected lower position while allowing the float means to buoyantly move downwardly relative to the decanter receptacle means to the decanter closed position, the float means being operative in the decanter closed position to shut-off flow into the decanter receptacle means while allowing continued discharge of liquid from the decanter receptacle means through the decant pipe means, the decanter receptacle means and decant pipe means having positive buoyancy when in the decanter closed position and at least partially empty to buoyantly support and raise the float means with the rim and float means above the liquid level.

2. A decant apparatus according to claim 1 further comprising an interconnecting means including a guide sleeve on the float means, a stem on the decanter receptacle means slidable in the guide sleeve, and head on the stem engageable with the float means in said decanter open position.

3. A decant apparatus according to claim 1 wherein the decanter receptacle means is pivotally connected to said inlet end of the decant pipe means and said discharge end of the decant pipe means comprises a pivotally connected pipe section extending through a wall of the tank.

4. A decant apparatus according to claim 3 wherein said discharge end of the pipe means is mounted on the tank at a level below the decanter receptacle means when the latter is in said preselected lower position.

5. A decant apparatus according to claim 4 wherein the decant valve means and the priming valve means are located outside the tank.

6. A decant apparatus according to claim 4 wherein the priming valve means is operative to a position for supplying liquid from the tank to said decant pipe means.

7. A decant apparatus according to claim 4 wherein the decant valve means is operative to a position for supplying liquid to the decant pipe means from a source external to the tank.

8. A decant apparatus for decanting liquid from adjacent the surface of liquid in a tank comprising: a decanter assembly including a decanter receptacle means having a top opening surrounded by a rim, decant pipe means having an inlet end communicating with the decanter receptacle means and a discharge end extending out of the tank, and float means overlying the decanter receptacle and connected thereto for relative movement between a decanter closed position in which the rim is in engagement with the float means and a decanter open position in which the decanter rim is spaced below the float means, the decanter receptacle means and decant pipe means having a negative buoyancy when filled with liquid and the float means having sufficient positive buoyancy to buoyantly support the decanter receptacle means in the decanter open position when the latter is filled with liquid, the decanter receptacle means and decant pipe means having positive buoyancy when empty sufficient to buoyantly support the float means in the decanter closed position, priming valve means operable to an open position for supplying priming liquid to the decanter receptacle means to reduce the buoyancy of the decanter receptacle means sufficient to allow the decanter receptacle means to move downwardly relative to the float means to the decanter open position with the decanter rim spaced a selected distance below the liquid level, decant valve means for discharging decanted liquid from the decanter receptacle means, and decanter stop means for stopping downward movement of the decanter receptacle means at a preselected lower position, whereby the float means can move downwardly relative to the decanter receptacle means to the decanter closed position, said decant valve means and priming valve means being located outside the tank.

9. A method of decanting liquid from adjacent the surface of liquid in a tank comprising:
(a) providing a decanter assembly in the tank, the decanter assembly including a decanter receptacle having a top opening surrounded by a decanter rim, a decant pipe having an inlet end communicating with the decanter receptacle and a discharge end extending out the tank, and a float overlying the decanter receptacle and connected thereto for relative movement between a decanter closed position in which the float engages the decanter rim and a decanter open position in which the decanter rim is spaced below the float, the decanter receptacle and decant pipe when empty having sufficient positive buoyancy to buoyantly support the float in the decanter closed position, the float having sufficient positive buoyancy to buoyantly support the decanter receptacle, when the latter is in the decanter open position and filled with liquid, (b) operating the decanter assembly through a decant cycle including the steps of:

i) starting a decant cycle when the surface of the liquid in the tank is at an upper level and the decanter assembly is buoyantly supported in the decanter closed position at the surface of the liquid in the tank, the starting step including preventing flow of liquid from the discharge end of the decant pipe and supplying decanter priming liquid to the closed decanter receptacle until the buoyancy of the decanter receptacle changes to a negative value and the decanter receptacle moves downwardly relative to the float to the decanter open position;

ii) a decant step comprising discontinuing supply of priming liquid to the decanter assembly and discharging decanted liquid from the decanter receptacle through the decanter pipe and iii) stopping downward movement of the decanter receptacle when the receptacle reaches a preselected lower position and continuing discharge of liquid from the decanter receptacle while the float moves downwardly relative to the decanter receptacle to the decanter closed position and at least until the decanter receptacle is sufficiently empty to buoyantly hold the decanter receptacle in the decanter closed position in engagement with the float.

10. A method of decanting liquid according to claim 9 wherein the decanter priming liquid is supplied from liquid in the tank.

11. A method of decanting liquid according to claim 10 wherein the decanter priming liquid is supplied from a source external of the tank.

12. A method of decanting liquid according to claim 9 wherein the preselected lower position of the decant receptacle is above the discharge end of the decant pipe.

13. A method of decanting liquid from adjacent the surface of liquid in a tank comprising:

(a) providing a decanter assembly in the tank, the decanter assembly including a decanter receptacle having a top opening surrounded by a decanter rim, a decant pipe having an inlet end communicating with the decanter receptacle and a discharge end extending out the tank, and a float overlying the decanter receptacle and connected thereto for relative movement between a decanter closed position in which the float engages the decanter rim and a decanter open position in which the decanter rim is spaced below the float, the decanter receptacle and decant pipe when empty having sufficient positive buoyancy to buoyantly support the decanter receptacle in the decanter closed position, the float having sufficient positive buoyancy to buoyantly support the float when the latter is in the decanter open position and filled with liquid, a decant valve outside the tank for controlling discharge of liquid from the decant pipe and a priming valve outside the tank for controlling supply of priming liquid to the decant pipe and (b) operating the decanter receptacle through a decant cycle including the steps of:

i) starting a decant cycle when the surface of the liquid in the tank is at an upper level and the decanter receptacle is buoyantly supported in the decanter closed position at the surface of the liquid in the tank, the starting step including closing the decant valve to stop flow of liquid from the discharge end of the decant pipe and opening the priming valve to supply decanter priming liquid to the closed decanter assembly until the buoyancy of the decanter receptacle and decant pipe changes to a negative value and the decanter receptacle moves downwardly relative to the float to the decanter open position, ii) a decant step comprising closing the priming valve to stop supply of liquid to the decanter receptacle and opening the decant valve to discharge liquid from the decanter receptacle through the decanter pipe and iii) stopping downward movement of the decanter receptacle when the receptacle reaches a preselected lower position and maintaining the decant valve open to continue discharge of liquid from the decanter receptacle while the float moves downwardly relative to the decanter receptacle to the decanter closed position and at least until the decanter receptacle is sufficiently empty to buoyantly hold the decanter receptacle in the decanter closed position engaging the float.

14. A method of decanting liquid according to claim 13 wherein the decanter priming liquid is supplied from liquid in the tank.

15. A method of decanting liquid according to claim 13 wherein the decanter priming liquid is supplied from a source external to the tank.

16. A method of decanting liquid according to claim 13 wherein said preselected lower position of the decant receptacle is above the discharge end of the decant pipe.

* * * * *

UNITED STATES PATENT AND TRADEMARK OFFICE
CERTIFICATE OF CORRECTION

PATENT NO. : 5,358,644
DATED : October 25, 1994
INVENTOR(S) : Thomas A. Dennis

It is certified that error appears in the above-identified patent and that said Letters Patent is hereby corrected as shown below:

Column 5, line 44, change "mans" to -- means --;

Column 6, line 2, insert -- a -- before "head";

Column 7, line 11, delete "," and insert -- and --;
         line 16, delete "assembly" and insert -- receptacle--;

Column 8, lines 7 and 8, delete "decanter receptacle" and insert -- float --;
         line 10, delete "float" and insert --decanter receptacle --;
         line 13, insert -- , -- after "pipe".

Signed and Sealed this

Twentieth Day of December, 1994

Attest:

BRUCE LEHMAN

Attesting Officer      Commissioner of Patents and Trademarks